(12) United States Patent
DeFrance

(10) Patent No.: US 6,173,103 B1
(45) Date of Patent: Jan. 9, 2001

(54) SPLIT OPEN DEAD END

(75) Inventor: Robert DeFrance, Poughkeepsie, NY (US)

(73) Assignee: Maclean Power Systems, Franklin Park, IL (US)

(*) Notice: Under 35 U.S.C. 154(b), the term of this patent shall be extended for 0 days.

(21) Appl. No.: 09/274,256

(22) Filed: Mar. 22, 1999

(51) Int. Cl.⁷ ...................................................... G02B 6/30
(52) U.S. Cl. .............................................. 385/136; 385/83
(58) Field of Search .................................. 385/134, 136, 385/137, 139, 83

(56) References Cited

U.S. PATENT DOCUMENTS

| 4,770,491 | 9/1988 | Champa et al. | 385/136 |
| 5,647,046 | * 7/1997 | Cowen et al. | 385/136 |
| 5,754,724 | 5/1998 | Peterson et al. | 385/135 |
| 5,758,005 | 5/1998 | Yoshida | 385/136 |
| 6,023,549 | * 2/2000 | Polidori | 385/136 |

* cited by examiner

*Primary Examiner*—Hung N. Ngo
(74) *Attorney, Agent, or Firm*—Pitney, Hardin, Kipp & Szuch, LLP

(57) ABSTRACT

The split open dead end cable connector includes two hinged halves with half circular serrated channels which align when the halves are in a closed position to form a serrated aperture for engaging the fiber optical cable. Lateral taper rail segments are likewise formed on the sides of the hinged halves which align when the halves are in a closed position to form tapered rails. Sliding wedges with internal channels complementary to the tapered rails are used to urge the halves together into a closed position. Prongs of a U-bail pass through loops formed on the sides of the halves of the body and the sliding wedges. Nuts threadably attached to the prongs of the U-bail secure the connector together and urge the sliding wedges to a position urging the halve to a closed position.

8 Claims, 3 Drawing Sheets

SPLIT OPEN DEAD END

BACKGROUND OF THE INVENTION

1. Field of the Invention

The invention pertains to a split open dead end which holds the outer layers of a cable without damaging the core of the cable and is particularly suited for use with fiber optic cables while having uses with other types of cables.

2. Description of the Prior Art

Fiber optic composite cable is used to construct utility transmission lines. This replaces overhead ground wire for communications applications and further protects the phase conductor on the transmission line from lightning damage and short circuit conditions. The delicate optical fibers are housed and protected in a cavity within the central core of the cable. Smaller wire strands are wound spirally about the outer surface of the cable.

The installation, rigging and engagement of fiber optic cable, including the use of a "dead end", must be done in a way that does not put excessive stress on the delicate optical fibers within the cable. Otherwise the optical fibers are damaged.

One prior art technique of protecting the fiber optic cable during installation and rigging is to use layers of material to wrap the fiber optic cable. However, this is labor intensive.

Other techniques include bolt-tightened and similar mechanical techniques without appropriate inherent limitations wherein over-tightening can damage the fiber optical cable and under-tightening can result in a failure of the engagement.

Examples of prior art include U.S. Pat. No. 5,758,005 entitled "Anchor Device for an Optical Cable", issued on May 26, 1998 to Yoshida; U.S. Pat. No. 5,754,724 entitled "Fiber Optic Support Apparatus", issued on May 19, 1998 to Peterson et al.; and U.S. Pat. No. 4,770,491 entitled "Dead End for Fiber Optic Shield Cable" issued on Sep. 13, 1988 to Champa et al.

OBJECTS AND SUMMARY OF THE INVENTION

It is therefore an object of this invention to provide a mechanism to engage cables, particularly fiber optic cables.

It is therefore a further object of this invention to provide a "dead end" for fiber optic cables.

It is therefore a still further object of this invention to provide such a device which does not damage the delicate optical fibers of a fiber optic cable.

It is therefore a still further object of this invention to provide such a device which has a limited range of tightening.

It is therefore a still further object of this invention to provide such a device which does not require excessive labor during installation.

It is therefore a final object of this invention to provide such a device which securely and reliably engages a fiber optical cable.

These and other objects are attained by providing a split open dead end with a body of two halves hinged together, two sliding wedges and a U-shaped bail. The two halves each include a half round serrated groove through the entire length thereof. The halves are folded over each other or assembled to form a cylindrical serrated aperture to engage the optical cable. The inside diameter of the resulting serrated aperture is designed to grip just the outer layer of an optical cable without creating any force on the fiber core. The two halves further have half taper rails along the length of both sides of the halves. When the two halves are folded over each other or assembled, half taper rails from both halves align on each side of the body and a full taper is formed on each side of the body. The two halves are held together by two sliding wedges with matching internal tapers, one sliding wedge on each side of the body. As the wedges travel up the taper of the body, the force is increased. This force increases until the two halves of the body are completely flush with each other. This limits the amount of force transmitted to the fiber optical cable. A U-shaped bail has parallel prongs which pass through apertures formed in external loops on the sliding wedge and in external loops and the hinge of the body. Nuts are then attached to the ends of the prongs of the bail.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
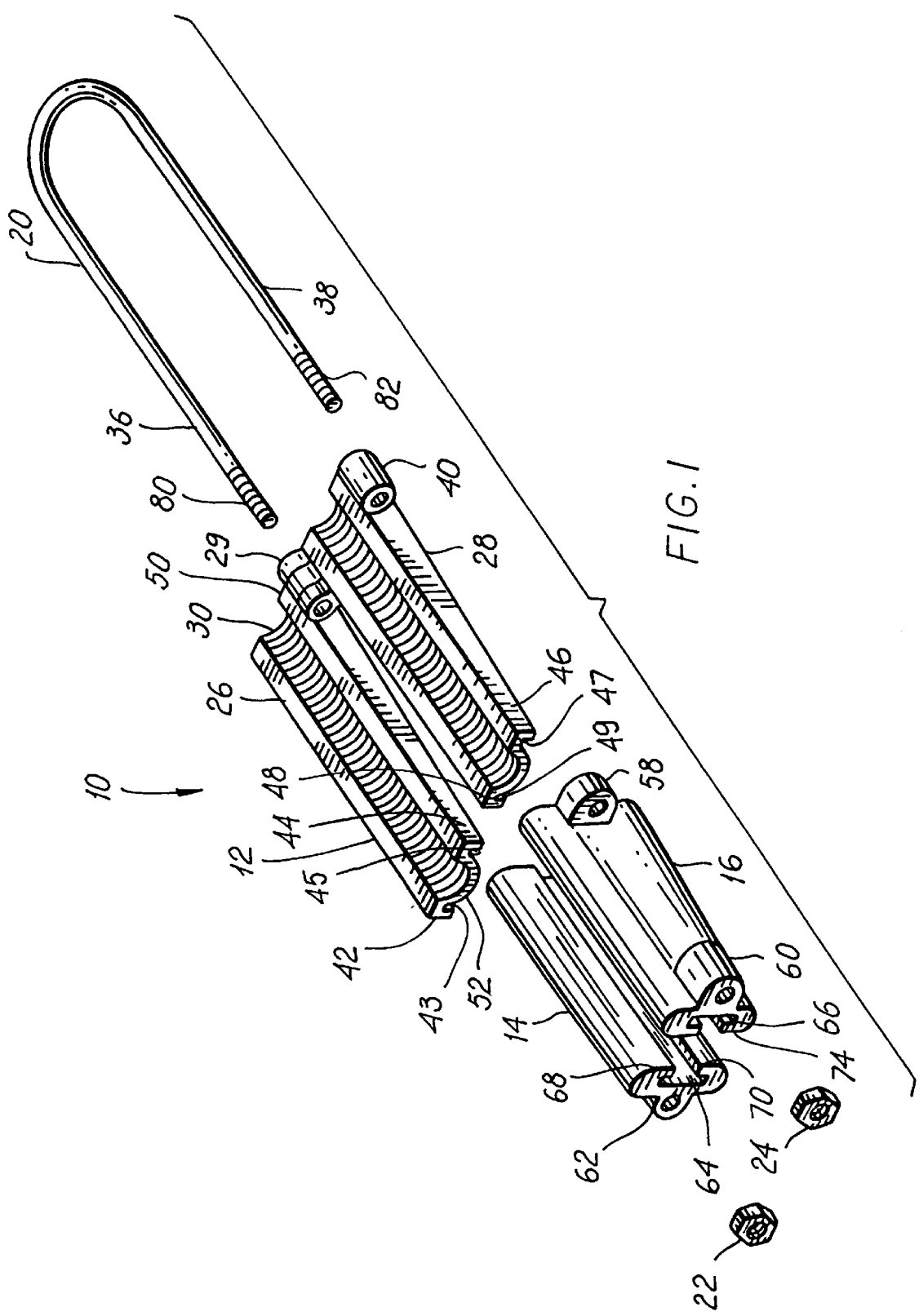
FIG. 1 is an exploded perspective view of the connector of the present invention, with the halves of the body in the open position.

Referring now to the drawings in detail, wherein like numerals refer to like elements throughout the several views, one sees that FIG. 1 is an exploded perspective view of the connector 10 of the present invention. Connector 10 includes body 12, sliding wedges 14, 16, U-bail 20 and nuts 22, 24.

Figure 2:
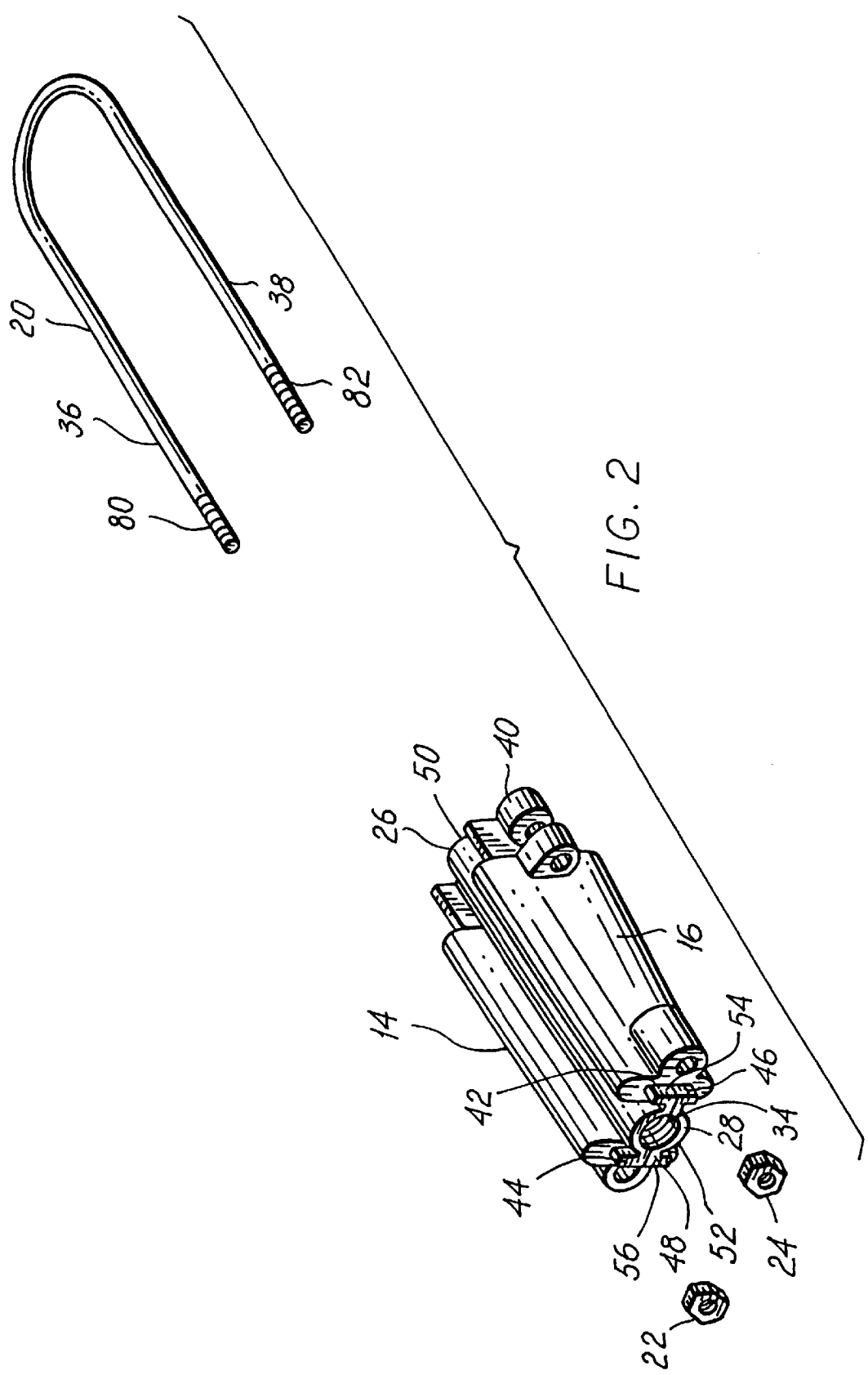
FIG. 2 is an exploded perspective view of the connector of the present invention, with the halves of the body in the closed position.
Figure 3:
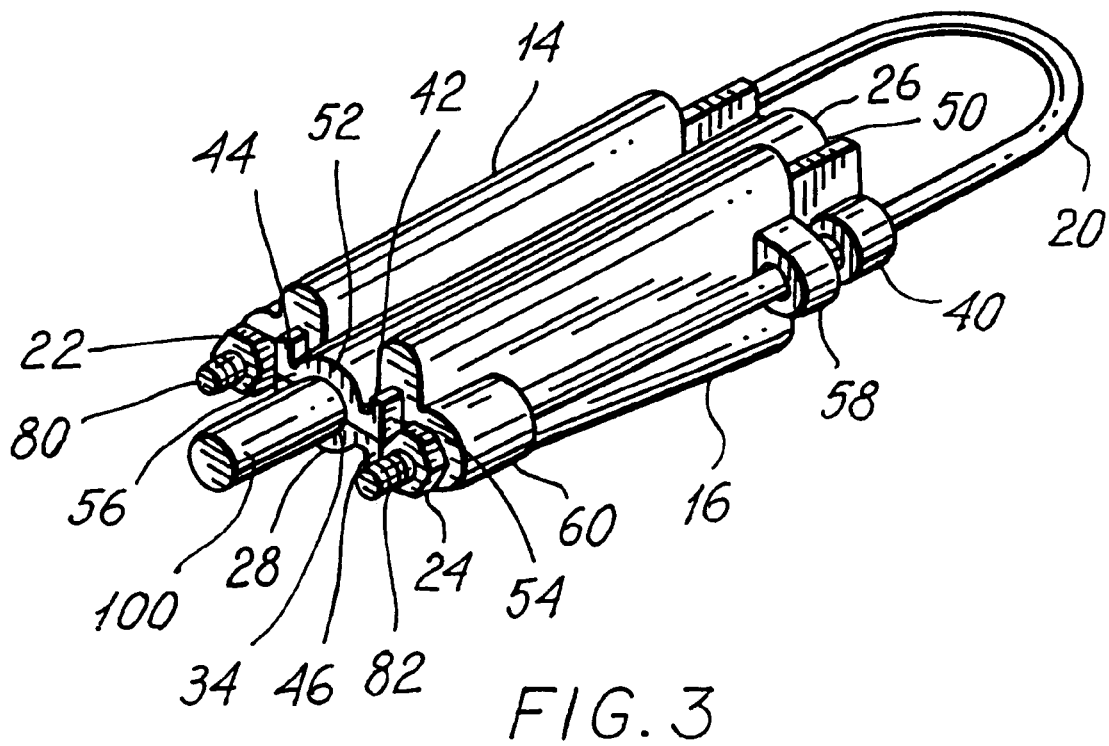
FIG. 3 is a perspective view of the connector of the present invention in the installed position, engaging fiber optic cable.

Body 12 includes halves 26, 28 which are hingeably connected to each other by hinge assembly 29. Halves 26, 28 include serrated longitudinal half-circular grooves 30, 32, respectively. Grooves 30, 32 are positioned so that when halves 26, 28 of body 12 are folded together into the closed position as shown in FIGS. 2 and 3, serrated aperture 34 is formed. The dimensions of serrated aperture 34 are selected so as to grip tightly the exterior of optical cable 100 without damaging the interior optical fibers (not shown). Similarly, this configuration inherently limits the tightness of serrated aperture 34. That is, when halves 26, 28 are in the closed position and tightly flush against each other, further tightening will not distort the dimensions of serrated aperture 34 and damage the interior optical fibers.

Hinge assembly 29 is hollow in order for prong 36 of U-bail to pass therethrough. Similarly, loop 40 is formed on a side of half 28 opposite hinge assembly 29 for prong 38 of U-bail to pass therethrough. Half taper rails 42, 44 are formed on sides of half 26. Similarly, half taper rails 46, 48 are formed on sides of half 28. Half taper rails 42, 44, 46, 48 are formed with wider ends on end 50 of body 12, proximate to hinge assembly 29 and loop 40 and with narrower ends on end 52 of body 12. Gaps 43, 45, 47, 49 are formed between half taper rails 42, 44, 46, 48 and body 10, respectively.

In the closed position of FIGS. 2 and 3, half taper rail 42 aligns with half taper rail 46 thereby forming full taper rail 54. Similarly, half taper rail 44 aligns with half taper rail 48 thereby forming full taper rail 56.

Sliding wedge 14 includes loops 58, 60 with apertures therethrough for receiving prong 38 of U-bail 20. Likewise, sliding wedge 16 includes loop 62 equivalent to loop 60 of sliding wedge and a second loop (not shown) equivalent to loop 58 of sliding wedge 14 for receiving prong 36 of U-bail 20.

Figure 4:
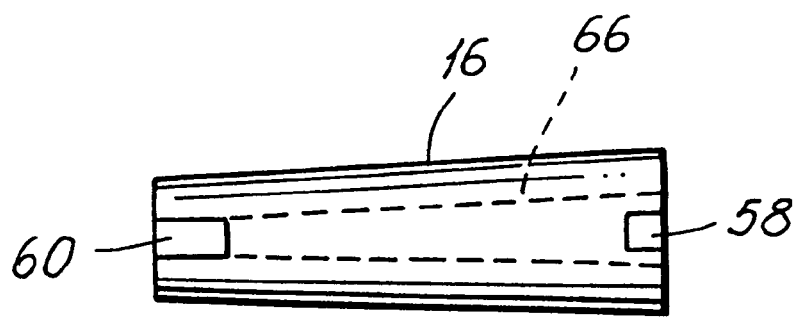
FIG. 4 is a side plan view, partially in phantom, of a sliding wedge of the connector of the present invention.

Sliding wedges 14, 16 include taper-shaped cavities 64, 66, respectively. As shown in FIG. 4, taper-shaped cavities 64, 66 have a narrow end proximate to loops 60, 62 and a widened end proximate to loop 58 (and corresponding unillustrated loop). Taper-shaped cavities 64, 66 are shaped complementary to full taper rails 56, 54, respectively. Additionally, taper-shaped cavities 64, 66 have cantilevered gripping lateral edges 68, 70 and 72, 74, respectively, to slidingly engage gaps 45, 49 and 43, 47, respectively, of body 12.

As sliding wedges 14, 16 are forced toward end 50 of body 12 by the tightening of bolts 22, 24 onto threaded ends 80, 82 of prongs 36, 38 of U-bail 20, halves 26, 28 are forced more tightly together. The tension exerted on fiber optic cable 100 by the installation and the weight of cable 100 is resisted by body 12 as it travels to a certain degree up U-bail 20 to a point where body 12 stops.

To use connector 10, the installer places fiber optical cable 100 into one of serrated longitudinal half-circular grooves 30 or 32, and folds halves 26, 28 to the closed position shown in FIG. 2. The connector 10 and the fiber optical cable 100 is selected so that the serrated aperture 34 formed in the closed position of FIG. 2 will tightly engage fiber optical cable 100 without damaging the optical fibers inside. The user then slides sliding wedges 14, 16 onto full taper rails 56, 54, respectively. The user then inserts U-bail 20 so that prong 36 passes through hinge assembly 29, the unillustrated loop corresponding to loop 58, and loop 62. Likewise, prong 38 passes through loops 40, 58 and 60. Nuts 22, 24 are then screwingly fastened onto threaded ends of prongs 36, 38 of U-bail 20.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A cable connector comprising:

a body comprising two portions, each of said portions including a channel and lateral taper rail segments, whereby said channels form an aperture to engage the cable and said lateral taper rail segments form taper rails upon alignment of said two portions;

wedge elements including internal tapered channels for engaging said taper rails;

means for securing said wedge elements to said body and for urging said internal tapered channels along said taper rails thereby urging said two portions against each other; and said means for securing includes a rigid U-shaped bail with first and second prongs, said first and second prongs including respective first and second threaded ends for receiving threaded nuts.

2. The cable connector of claim 1 wherein said channels have a half-circular cross section.

3. A cable connector comprising:

a body comprising two portions each of said portions including a channel and lateral taper rail segments, whereby said channels form an aperture to engage the cable and said lateral taper rail segments form taper rails upon alignment of said two portions;

wedge elements including internal tapered serrated channels for engaging said taper rails, said channels have a half circular cross section; and means for securing said wedge elements to said body and for urging said internal tapered channels along said taper rails thereby urging said two portions against each other.

4. The cable connector of claim 3 wherein said portions are connected to each other by a hinge.

5. The cable connector of claim 4 wherein said means for securing includes a U-shaped bail with first and second prongs, said first and second prongs including respective first and second threaded ends for receiving threaded nuts.

6. The cable connector of claim 5 wherein said portions and said portions include lateral loops with apertures therethrough, said first and second prongs of said U-shaped wire passing through said loops.

7. The cable connector of claim 6 wherein one of said lateral loops is formed within said hinge.

8. The cable connector of claim 7 wherein gaps are formed between said lateral taper rail segments and said portions, and wherein said internal tapered channels include cantilevered lateral gripping edges which slidingly travel in said gaps.

* * * * *